(No Model.) 2 Sheets—Sheet 1.
J. TONKS.
ELASTIC TIRE FOR WHEELS.
No. 552,307. Patented Dec. 31, 1895.
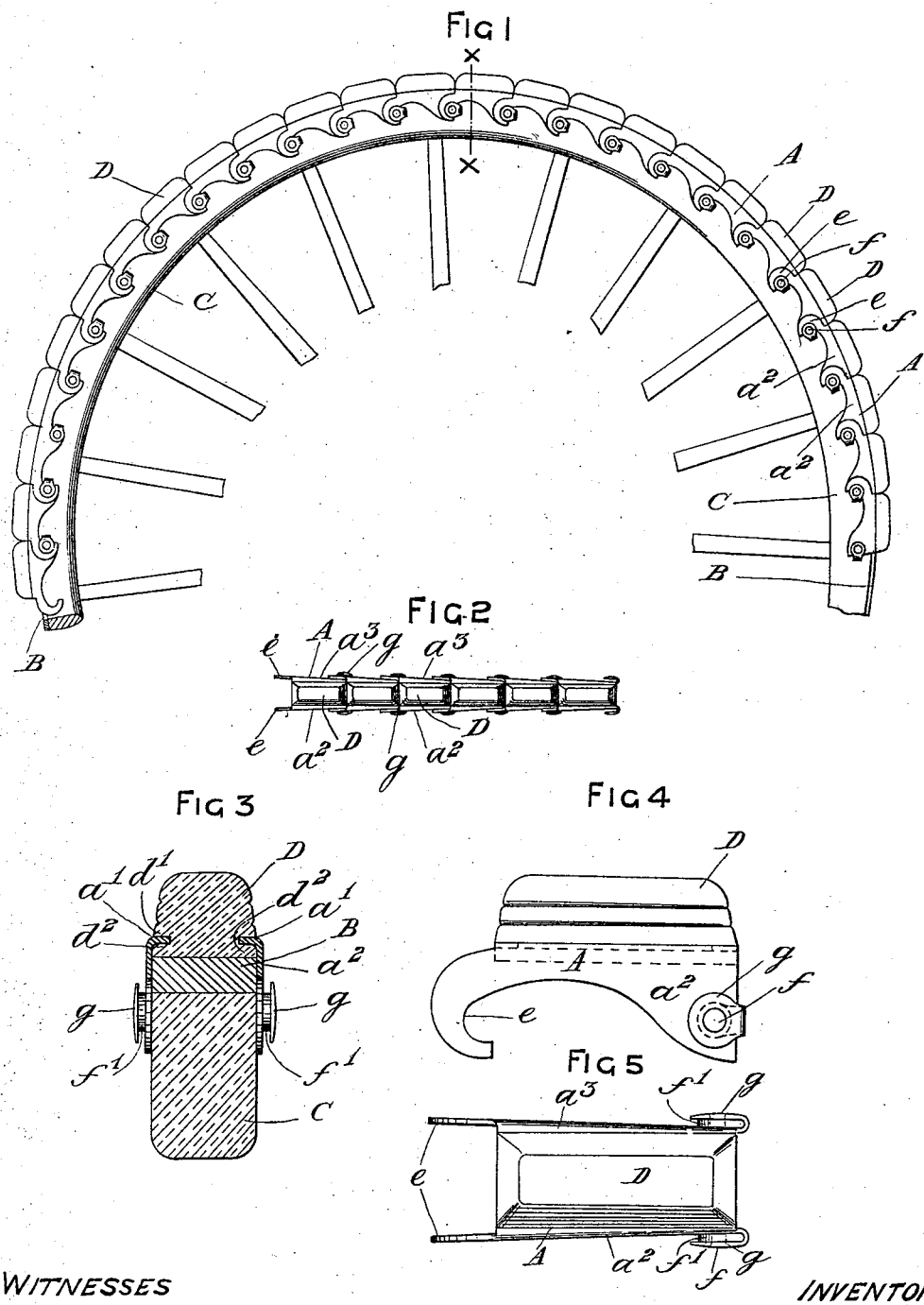
WITNESSES
Charles Bosworth KeMay
Herbert Whitehouse
INVENTOR
James Tonks
ANDREW B.GRAHAM. PHOTO-LITHO. WASHINGTON.D.C.

(No Model.) 2 Sheets—Sheet 2.
J. TONKS.
ELASTIC TIRE FOR WHEELS.

No. 552,307. Patented Dec. 31, 1895.

WITNESSES
Charles Bosworth Kelley
Herbert Whitehouse.

INVENTOR
James Tonks

UNITED STATES PATENT OFFICE.

JAMES TONKS, OF BIRMINGHAM, ENGLAND.

ELASTIC TIRE FOR WHEELS.

SPECIFICATION forming part of Letters Patent No. 552,307, dated December 31, 1895.

Application filed June 20, 1895. Serial No. 553,435. (No model.)

*To all whom it may concern:*

Be it known that I, JAMES TONKS, a subject of Her Majesty the Queen of Great Britain and Ireland, residing at Birmingham, in the county of Warwick, England, have invented certain new and useful Improvements in and Connected with Elastic Tires for the Wheels of Common Road-Vehicles, of which the following is a specification.

This invention has reference to elastic tires for fixing over the ordinary metal tires of the wooden wheels of common road-vehicles, my object being to so construct and arrange the parts of the said elastic tires that they can by any inexperienced person be quickly fixed onto and around or removed from an ordinary wooden wheel of a vehicle provided with an ordinary metal tire and so as to be readily altered to suit wheels of various diameters.

An elastic tire constructed according to this invention for the purposes above stated consists of a number of short metal links or sections constructed as hereinafter described, so as to be connected together and fixed all round the ordinary metal tire of the wooden wheel, each section being fitted with an india-rubber block or stud or short portion of the india-rubber tire, so that when the metal links or sections are applied and fixed to the wheel the india-rubber blocks or studs or short sections of india-rubber tire will project through the said metal links or sections beyond the periphery of the wheel and thus form the elastic tire of the wheel. I make the said metal links or sections and the india-rubber blocks or studs or india-rubber sections and secure them together and around the wheel in the manner which I will now describe by referring to the accompanying drawings, on which—

Figure 6:
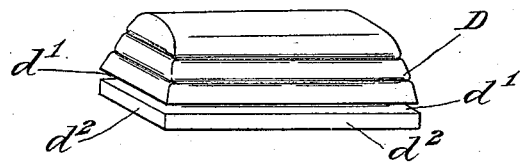
Figure 7:
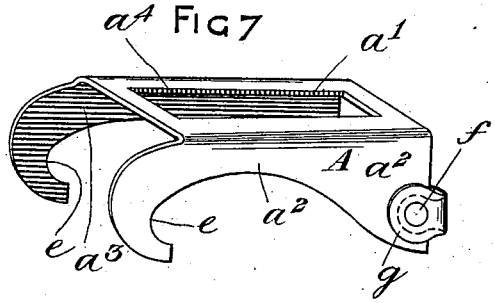

Figure 1 represents in side elevation a portion of a vehicle-wheel with my improved tire applied thereto. Fig. 2 is a plan of a portion of the said tire. Fig. 3 is a cross-section through line X X of Fig. 1, but drawn on an enlarged scale. Fig. 4 is a side elevation, and Fig. 5 is a plan, of one of the metal links or sections of the tire shown by Figs. 1, 2, and 3 with the india-rubber block fixed thereto. Fig. 6 shows the said india-rubber block separately. Fig. 7 shows one of the said metallic links or sections separately, and Fig. 8 illustrates the means which may be employed for placing my improved sectional tire in position around the wheel.

The same letters of reference indicate the same or corresponding parts in all the figures.

I make each of the said metal links or sections preferably from sheet metal or as a metal stamping, (or the said links or sections may be made of malleable cast metal,) each of about the form shown more clearly by Fig. 7, by which it will be seen that the link A is made somewhat of an inverted trough section consisting of an upper part $a'$ and two downwardly-projecting side portions $a^2$ $a^3$ at the proper distance apart for the ordinary metal tire B and fellies C of the wheel to fit between them. In the upper part $a'$ of each of the links A there is formed a hole $a^4$, through which projects the india-rubber block or stud D, which is made with a contracted neck $d'$ to fit the hole $a^4$ and also has an enlarged base $d^2$, which fits underneath the top part $a'$ of the section A and beds on the ordinary metal tire B. The enlarged base $d^2$ keeps the metal block D in place in the hole $a^4$ and prevents the block becoming detached from the section when the sections are fixed round the wheel. In order to secure the sections together to form an endless tire around the wheel each of the sections has its sides $a^2$ $a^3$ formed as hooks $e$ at one end and made with a projecting side stud $f$ at the other end, these studs $f$ being of a size for the hooks $e$ of the next section to engage with. The studs $f$ are by preference made with flat heads $g$, as shown, so as the better to prevent the hooked end $e$ of the next section from springing off the studs. The said studs may be formed and fixed to the sides $a^2$ $a^3$ in various ways. For instance, as shown in Figs. 4, 5, and 7, the heads $g$ of the studs can conveniently be made of projecting ears formed on the sides $a^2$ $a^3$, which are bent back parallel with the said sides at a short distance therefrom and secured by the stud $f$ passing through the ears and through the sides $a^2$ $a^3$, the ends being riveted over, a suitable distance-block or washer $f'$ forming the part of the stud for the hooks to engage with being threaded on the studs $f$ to make up the spaces between the ears $g$ and the sides $a^2 a^3$. The space between the hooked ends $e$ $e$ of the sides $a^2$ $a^3$ at one end of the section To form the tire a sufficient number of sections A with their india-rubber blocks D are linked together by the hooked sides of each section engaging with the corresponding studded sides of the next section, as above described, and these are placed round the wheel so as to embrace the ordinary metal tire B and fellies C, as shown in Figs. 1 and 3, and drawn tightly round the wheel, so that the first and last sections can be hooked together to complete the tire, when if the tire has been tightly pulled round the wheel and it is of the proper length it will be perfectly secure, as the enlarged bases $d^2$ of the sections allow a certain amount of stretch of the sectional tire to enable the first and last sections to be hooked together.

Figure 8:
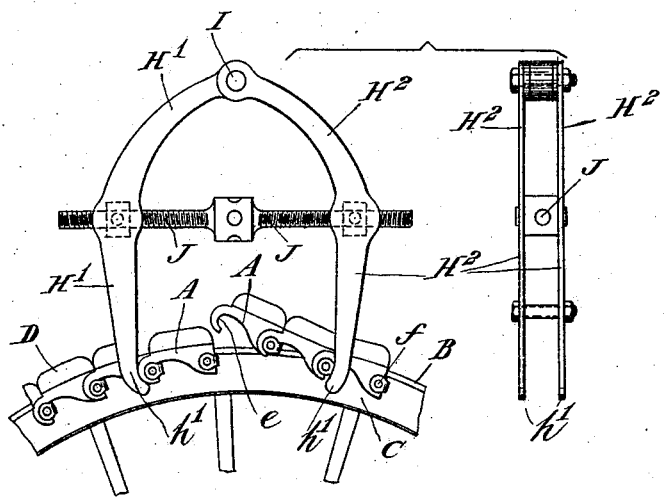

I find the screw-cramp illustrated by Fig. 8 a useful tool for drawing the sectional tire tightly round the wheel to enable the first and last sections to be hooked together. This cramp forms no part of this invention and consists of two levers $H' H^2$ jointed together at I, the other ends $h'$ of the levers being made forked of the proper size to engage with the ends of the sections A, as shown, and these levers $H' H^2$ being connected together by a right and left hand screw J by turning which the levers $H' H^2$ and the sections A with which they are engaging can be drawn together, so as to permit of the first and last sections being hooked together to complete the tire and secure the same to the wheel as aforesaid. The said cramp is similarly used for drawing the sections together to unhook the same when it is desired to remove the tire from the wheel.

By increasing or diminishing the number of links or sections A the tire can be lengthened or shortened so as to suit any diameter of wheel. If one of the links or sections A should break or become damaged, this can readily be removed and replaced by a new link or section, and when one or more of the india-rubber blocks D becomes worn the same can readily be removed and replaced by a new india-rubber block.

It will be evident that instead of making each of the sections A of a sufficient length to take only one of the india-rubber blocks common road vehicles formed of a series of metallic sections shaped so as to embrace the ordinary metallic tire and wooden fellies and hook together at the sides of the same and each provided with one or more india rubber blocks which together form the wheel tread and fit in corresponding perforations in the metallic sections and extend between the insides of the metallic sections and the periphery of the ordinary metal tire of the wheel, all substantially as described.

2. A sectional tire comprising the metallic sections having the elastic tread pieces carried in their upper portions and having depending sides and hooks arranged to fit along the sides of the felly and the ordinary metallic tire of the wheel, substantially as described.

3. A sectional elastic tire comprising the metallic sections having the depending sides with hooks at the front ends thereof and studs at the rear of said sides to receive the hooks of the adjacent sections, said sections having the opening $a^4$ in the upper part with inwardly turned flanges $a'$ and the grooved rubber blocks held by said flanges, substantially as described.

4. The combined metallic and rubber sections for forming an elastic tire for the wheels of common road vehicles, each of the said sections consisting of a metallic part shaped so as to embrace the sides of the ordinary metallic tire and wooden fellies and hook to the next sections at the sides thereof, and provided with one or more india rubber blocks to form a portion of the wheel tread, the said india rubber block or blocks fitting in a corresponding perforation or perforations in the metallic section and provided with an enlarged base fitting inside the metallic section to bear against the ordinary metallic tire of the wheel all substantially as hereinbefore described and illustrated by the accompanying drawings.

In witness whereof I have hereunto set my hand in presence of two witnesses.

JAMES TONKS.

Witnesses:
 CHARLES BOSWORTH KELLEY,
 HERBERT WHITEHOUSE.